J. HOOD & S. H. REYNOLDS.
FOIL CONDENSER.

No. 182,670. Patented Sept. 26, 1876.

Attest:
S. E. Chandler
S. Ten Eyck

Inventor:
John Hood
Stephen H Reynolds

UNITED STATES PATENT OFFICE.

JOHN HOOD AND STEPHEN H. REYNOLDS, OF BOSTON, MASSACHUSETTS.

IMPROVEMENT IN FOIL-CONDENSERS.

Specification forming part of Letters Patent No. 182,670, dated September 26, 1876; application filed August 9, 1876.

*To all whom it may concern:*

Be it known that we, JOHN HOOD and STEPHEN HENRY REYNOLDS, of the city of Boston, in the county of Suffolk, and State of Massachusetts, have invented certain new and useful Improvements in Foil-Condensers; and we do hereby declare that the following is a full, clear, and exact description thereof, reference being had to the accompanying drawings, and to the letters of reference marked thereon, which form a part of this specification.

This invention relates to an improvement in the method and mechanism employed for condensing and forming into rolls or cylinders gold or other foil for dental uses, the object being to simplify the process, as well as to furnish a machine which shall be capable of producing the cylinders rapidly; and the invention consists in the construction and arrangement of the different parts of the machine, and in the process by which the cylinders are formed and annealed, as will be hereinafter fully set forth, and then specifically pointed out in the claims.

Figure 1:
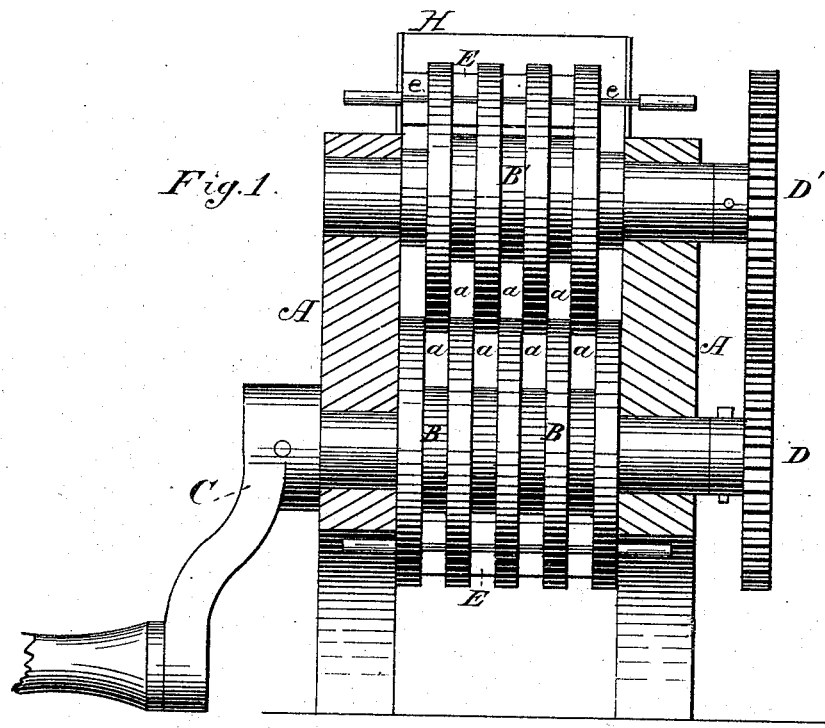
Figure 2:
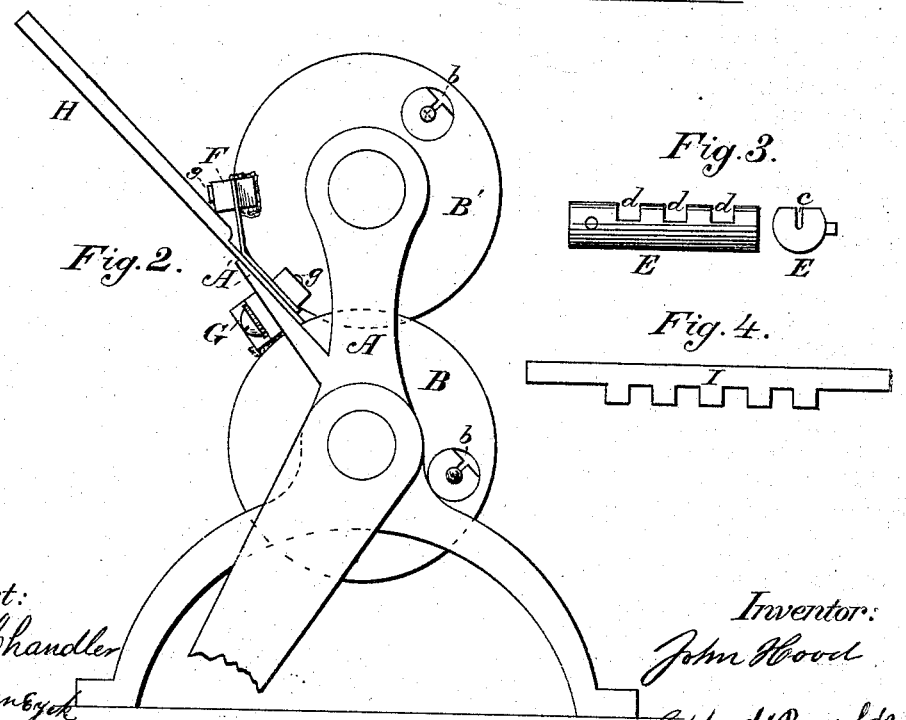
Figure 3:
Figure 4:
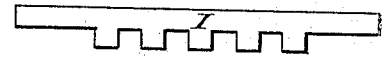

Figure 1 is a front view of the machine, the frame being shown in section. Fig. 2 is a side view, with the gear-wheels removed, so as to exhibit more clearly the method of supporting the feed-table and wipers. Fig. 3 presents an end view and side view of one of the cylindrical beds. Fig. 4 shows the comb or device used for pressing down the strips of foil upon the cylindrical beds after they have been cut by the rotary cutters.

A represents the frame of the machine, composed of two side pieces, provided with suitable journal-boxes to receive the journals of the rotary cutters B and B'. These cutters are formed by cutting into cylinders of metal a series of grooves, $a\ a$, or they may be formed by making the cutters of disk shape, with a central orifice, through which the shaft upon which they are secured passes, suitable washers being placed between the cutters to keep them at a proper and equal distance apart.

The journals upon which the cutters rotate are placed at such a distance from each other that one series of cutting-disks enters the spaces between the other series a short distance. The thickness of the cutters and width of the spaces being equal, it is evident that when the cutters are rotated in opposite directions, their edges will have a shearing action upon any substance which may be passed between them.

A crank, C, is attached to the shaft of the rotary cutter B, and upon the opposite end of the same shaft is secured a gear-wheel, D, which engages with the gear-wheel D' upon the shaft of the rotary cutter B', thus securing simultaneous movement in both cutters.

A circular orifice, $b$, is bored through each of the cutting-disks on a line parallel to their axis for the reception of the cylindrical beds E. These beds are made by first forming a cylinder of the same diameter as the orifices in the cutting-disks they are intended to enter, and of a length equal to that of the series of cutting-disks, forming one of the rotary cutters. The cylinder is then flattened upon one side, and a longitudinal groove, $c$, cut through it from end to end, and of such depth as to slightly pass the center of the cylinder. A series of transverse grooves, $d$, are then formed, the metal being removed to the center, thus forming a passage, through which the strips of foil may pass, while the longitudinal groove $c$ receives the split mandrels $e$ upon which the foil is rolled in forming it into cylinders.

Secured to the projecting arms A of the frame by the bolts $g$ are two wipers, F and G, which are preferably constructed of wood in the form shown by Fig. 4, the projecting parts which enter between the cutting-disks, as well as that portion which bears against their periphery, being carefully padded or covered with cotton or analogous material in order to keep the surfaces and edges of the cutters perfectly clean, so as to prevent the adherence of the foil to them during the cutting operation. A feed-table, H, is secured to the arms A' at an angle of forty-five degrees or thereabout by the same bolts $g$ that secure the wipers to the frame, the obliquity of the table serving to assist the entrance of the foil between the rotary cutters.

I, Fig. 4, represents a comb or device used for pressing the strips of foil down into the transverse grooves of the cylindrical beds preparatory to winding them upon the split mandrels $e$.

The method of operating the machine is as follows: The cylindrical beds are inserted into their proper places in the rotary cutters, and these are turned until the bed in the lower one is on top and in close proximity to the feed-table, the bed in the upper rotary cutter occupying a corresponding position above the lower one. A sheet or sheets of foil are then placed on the feed-table, the crank turned so as to draw the sheets through between the cutters, which cuts the foil into strips, one end of which will rest upon the cylindrical beds. One-half of a split mandrel is then inserted into the longitudinal grooves of the beds; the foil is then pressed down upon the mandrels by means of the comb I; the other half of the mandrels is inserted into the groove above the foil, thus inclosing the ends of the strip of foil. Now, by rotating the mandrels between the thumb and finger of the operator, the foil will be rolled into a compact cylinder; and this completes the operation of forming them, so far as the machine can assist, but were the cylindrical beds and mandrels at once removed, the elasticity of the foil would cause it to unroll to such an extent as to be perfectly useless for the purpose intended.

In order to prevent this unrolling and retain the cylinder in its condensed state, it becomes necessary to anneal it, so that it shall lose its elasticity. This is accomplished by withdrawing the cylindrical beds with the mandrels and rolled cylinders from the machine and placing them with the flattened side downward upon sheets of mica. They are then exposed to the flame of a gas-jet or other suitable heat of sufficient intensity to aneal the foil and cause it to adhere, when again rotated by means of the split mandrel to such an extent as to prevent all danger of its unrolling. The cylinders of foil are then removed from the cylindrical beds, and the split mandrels withdrawn, thus completing the process.

We are aware that slitting-mills for cutting sheets of iron and other metals into strips by means of rotary cutters are old, and do not therefore claim such process alone; but What we do claim, and desire to secure by Letters Patent of the United States, is as follows:

1. The cylindrical beds E, provided with the longitudinal groove c and transverse grooves d, substantially as and for the purpose set forth.

2. The rotary cutters B and B', in combination with the cylindrical beds E, as and for the purpose specified.

3. The wipers F and G, in combination with the rotary cutters B and B', as and for the purpose set forth.

4. The combination of the rotary cutters B and B', provided with the cylindrical beds E and split mandrels e, with the wipers G F and inclined feed-table H, substantially as and for the purpose set forth.

In testimony whereof, we have hereunto affixed our signatures this 11th day of July, 1876, in the presence of two witnesses.

JOHN HOOD.
  STEPHEN H. REYNOLDS.

Witnesses:
  FRED. S. KETLETT,
  JAS. B. BELL.